United States Patent [19]

Hess et al.

[11] 3,770,574

[45] *Nov. 6, 1973

[54] COKING OF SPENT PULPING LIQUORS WITH SUBSEQUENT $SO_2$ ABSORPTION

[75] Inventors: Howard V. Hess, Glenham; Edward L. Cole, Fishkill, both of N.Y.

[73] Assignee: Texaco Inc., New York, N.Y.

[ * ] Notice: The portion of the term of this patent subsequent to Jan. 26, 1988, has been disclaimed.

[22] Filed: Nov. 12, 1969

[21] Appl. No.: 875,617

Related U.S. Application Data

[63] Continuation-in-part of Ser. No. 780,079, Nov. 29, 1968, Pat. No. 3,607,619.

[52] U.S. Cl.................. 162/31, 162/36, 423/207
[51] Int. Cl..................... D21c 11/02, D21c 11/14
[58] Field of Search.................. 162/30, 31, 36; 23/48, 49; 210/56, 63, 71; 423/207, 208

[56] References Cited
UNITED STATES PATENTS

| | | | |
|---|---|---|---|
| 3,003,908 | 10/1961 | Mannbro | 162/36 X |
| 3,336,101 | 8/1967 | Hellerquist | 23/48 |
| 3,558,426 | 1/1971 | Hess et al. | 162/30 |

Primary Examiner—S. Leon Bashore
Assistant Examiner—Alfred D'Andrea, Jr.
Attorney—Thomas H. Whaley and Carl G. Ries

[57] ABSTRACT

Spent Sulfite liquor from a sulfite mill digester is preheated and then heated in a closed system at a temperature in the range of 450° to 700°F under autogenous pressure for a period of 0.5 minutes to six hours to form an effluent liquid and a sulfur-containing coke. The coke is burned to furnish steam for the process and flue gas from which the $SO_2$ evolved is absorbed by the effluent liquid thus forming additional cooking liquor which is recycled to the digester. Volatile gases from the digester are also oxidized to $SO_2$ which is combined with that formed by burning the coke.

4 Claims, 1 Drawing Figure

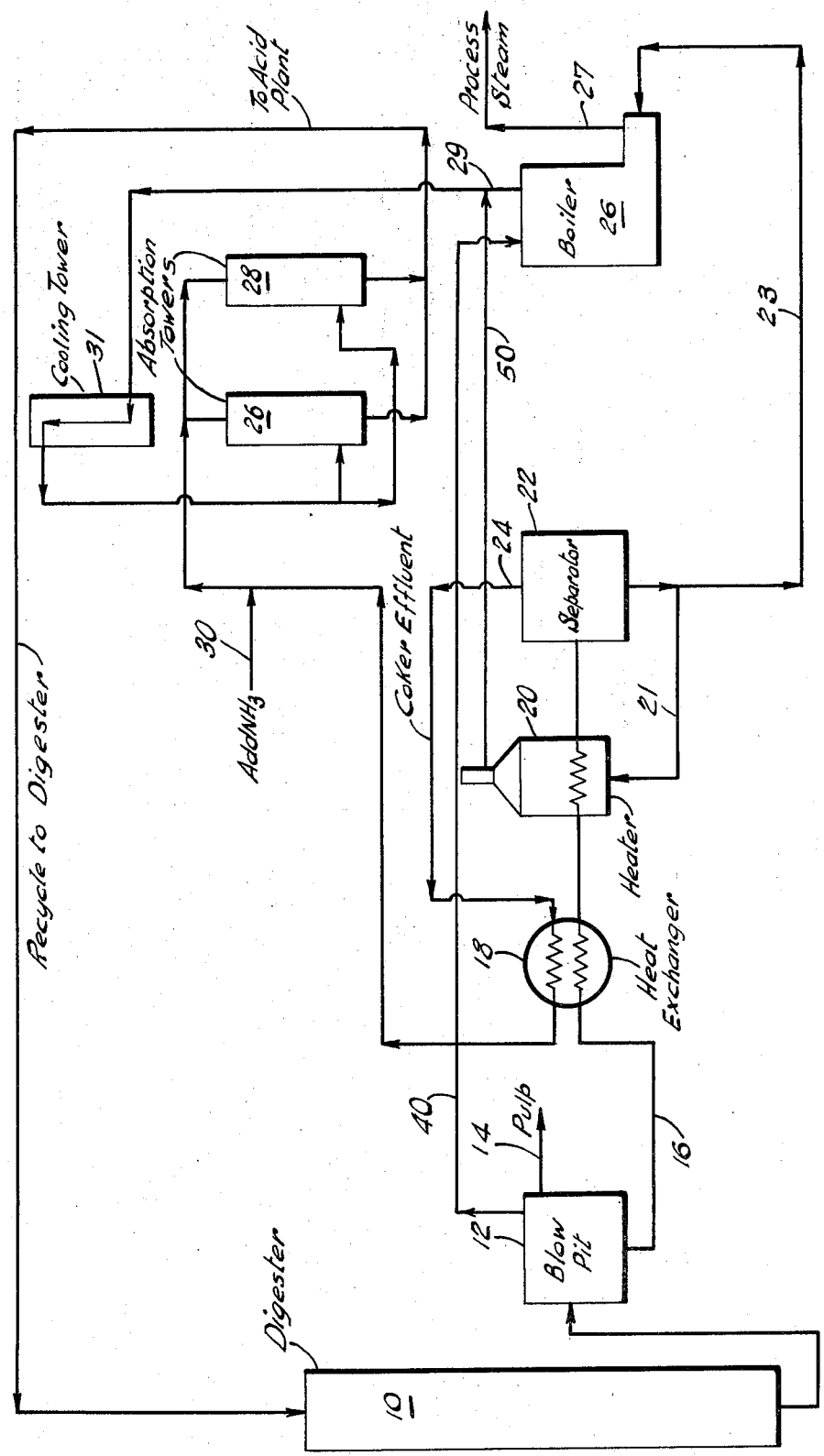

COKING OF SPENT PULPING LIQUORS WITH SUBSEQUENT SO₂ ABSORPTION

This application is a continuation in part of commonly assigned U.S. application Ser. No. 780,079, filed Nov. 29, 1968, now U.S. Pat. No. 3,607,619.

FIELD OF THE INVENTION

This invention relates to a sulfite waste disposal process operating in a closed system which provides a means for disposing of the coke formed during any sulfite pulping processes and produces cooking liquor for the sulfite pulping process from the products of the coking operation.

Cooking liquor for the sulfite process is usually prepared by the reaction between sulfur dioxide and limestone in the presence of water forming calcium bisulfite. Instead of using limestone, which forms a calcium-based sulfite and liquor, the acid cooking liquor may be prepared from ammonium carbonate, ammonium hydroxide, magnesium carbonate, magnesium hydroxide or the carbonate, bicarbonate, sulfite or hydroxide of sodium. In some systems, dolomitic lime is used in place of high calcium lime. In the sulfite process, the cooking liquor composition typically contains 7 percent by weight $SO_2$ in which 4.5 percent is combined as sulfurous acid and 2.5 percent as alkali metal bisulfite.

DESCRIPTION OF THE PRIOR ART

Sulfite pulp mills contribute seriously to water and air pollution; thus the waste liquors from such mills cannot be disposed of by feeding into streams without prior treatment because of their high chemical and biological demand. The air pollution problem caused by sulfite pulp mills is due to the terpene-like odors emanating from the digester and the $SO_2$ and mercaptan leaks in the various storage tanks, washers, dump tanks and absorption towers used in the mills.

In the most practical and advantageous process for the treatment of sulfite waste practiced to date and disclosed in the above-identified patent application, the waste liquor is heated under pressure to form a granular coke product which is separated from the resulting liquid to yield an effluent suitable for reuse in the pulp making process. The coke may be burned to supply heat for the process. Alternatively, it may be further carbonized by heating to produce high grade coke for metallurgical purposes or heated and partially oxidized to produce a good grade of activated carbon. Cooking liquor, on the other hand, may be regenerated by adding chemicals to the effluent. Thus both the solid and the liquid products of the described process require further handling if they are to be reused. Stated another way that process, and indeed all the other prior art processes used for the same purpose, does not operate in a closed circuit.

OBJECTS AND SUMMARY OF THE INVENTION

The main object of the claimed invention is to provide a closed cycle process for eliminating the water and air pollution problems encountered in the sulfite pulping processes.

An equally important object of the invention is to provide for the advantageous use of coke and decoked liquor in a sulfite pulping process.

The process of the present invention whereby the foregoing objects are attained comprises continuously supplying spent aqueous sulfite liquor and volatile gases from a digester, heating the liquor in a closed system at a temperature in the range of 450° to 700°F. for a period of 0.5 minutes to six hours under autogenous pressure sufficient to prevent vaporization of the water to form a sulfur-containing coke and an aqueous effluent, separating the coke from the effluent, burning said volatiles and at least part of the coke thereby producing steam, heat for forming coke and sulfur dioxide, and contacting the sulfur dioxide with the effluent thereby forming additional cooking liquor and recycling the cooking liquor to the digester.

The claimed process will be better understood by reference to the accompanying FIGURE illustrating diagrammatically a preferred embodiment of the present invention as applied to the treatment of sulfite waste liquor from a sulfite mill digester.

With reference to the FIGURE, wood chips are cooked in cooking liquor supplied from a suitable source. The cooking liquor may contain calcium, magnesium, sodium or ammonium bi-sulfite. Generally the chips are processed at cooking temperatures in the range of 265° to 350°F. at pressures up to 125 psi for 2 to 20 hours.

At the end of the cooking period the contents of digester 10 are discharged to a separation tank or blow pit 12 with the pulp being removed through line 14 and the spent liquor is passed through line 16 and heat exchanger 18 where it is preheated with hot recycle liquor from a source described hereinafter and then fed into a fired heater or coker 20 employing coke from a source to be described later. The blow gases which contains mercaptans such as methyl mercaptan and dimethyl sulfide pass through line 40 to boiler 26 where they are converted to sulfur dioxide. The liquor is heated to a temperature within the range of about 450° to 700°F. and preferably at 550°F. to 650°F and 1,050 to 3,000 psig for about 10 minutes to an hour. The resulting hot liquor is then introduced into a separator 22. Here the coke is separated by filtering, centrifuging or any other suitable means, and part of it is returned to heater 20 via line 21 to be burnt and another part passes through line 23 and is burned in boiler 26 to provide steam which is withdrawn through line 27 and flue gas which passes through line 29 into a cooling tower 31 and then absorption towers 26 and 28. Any sulfur dioxide given off by the coke in heater or coker 20 is sent on to line 29 via line 50. The liquid left after separation of the coked organic material passes through line 24 and heat exchanger 18 on its way to absorption towers 26 and 28, which are liquid-gas absorbers. If required, the liquid may be fortified with ammonia or other makeup chemicals through line 30 before passing through the absorption towers where it picks up $SO_2$ and is recycled to the digester as cooking liquor. Naturally additional makeup chemicals can be added as required.

In a practical example of the invention a waste sulfite liquor having a temperature of 265° – 300°F. in the digester was coked at 550°F. and 1,050 psi and held in a coke drum for 10 minutes with the results tabulated below:

| | Yield wt. percent | Percent dissolved solids | COD Mg/O$_2$/L | Percent ash | Percent C | Percent sulfur | Percent nitrogen | Percent hydrogen | Gross heat of combustion BTU/lb. |
|---|---|---|---|---|---|---|---|---|---|
| Waste sulfide liquor | | 13.6 | 215,000 | 0.12 | 7.4 | 0.81 | 0.35 | | |
| Effluent from coker | 87.2 | 1.42 | 15,900 | .06 | 1.0 | .1 | .14 | | |
| Coke | 9.4 | | | 8.02 | 60.6 | 6.8 | 2.64 | 3.9 | 10,376 |

As can be seen from the above the main advantage of the invention is that no effluent water is rejected from the digestion and coker cycle so that water pollution problems do not arise and since SO$_2$ is absorbed possible air pollution problems are minimized.

We claim:

1. Process for the treatment of spent sulfite liquor and volatile gases from a sulfite mill digester comprising heating said liquor; coking said liquor at a temperature in the range of 450° to 700°F under autogenous pressure for a period of between 0.5 minutes to 6 hours to form a sulfur-containing coke and an effluent liquid, separating said coke from said effluent; burning said coke and said volatile gas to provide steam, heat for said coke-forming and sulfur dioxide; contacting said sulfur dioxide with said effluent to absorb the same and recycling said effluent to said digester.

2. The process according to claim 1 wherein ammonia is added to said effluent prior to contacting with said sulfur dioxide.

3. The process according to claim 1, wherein said liquor is heat exchanged with said effluent liquid before coking.

4. The process according to claim 1, wherein said liquor is heated at a temperature in the range of 550°F to 650°F under a pressure ranging from about 1,050 to about 3,000 psig for a time interval ranging from about 10 minutes to about an hour.

* * * * *